Patented Oct. 10, 1922.

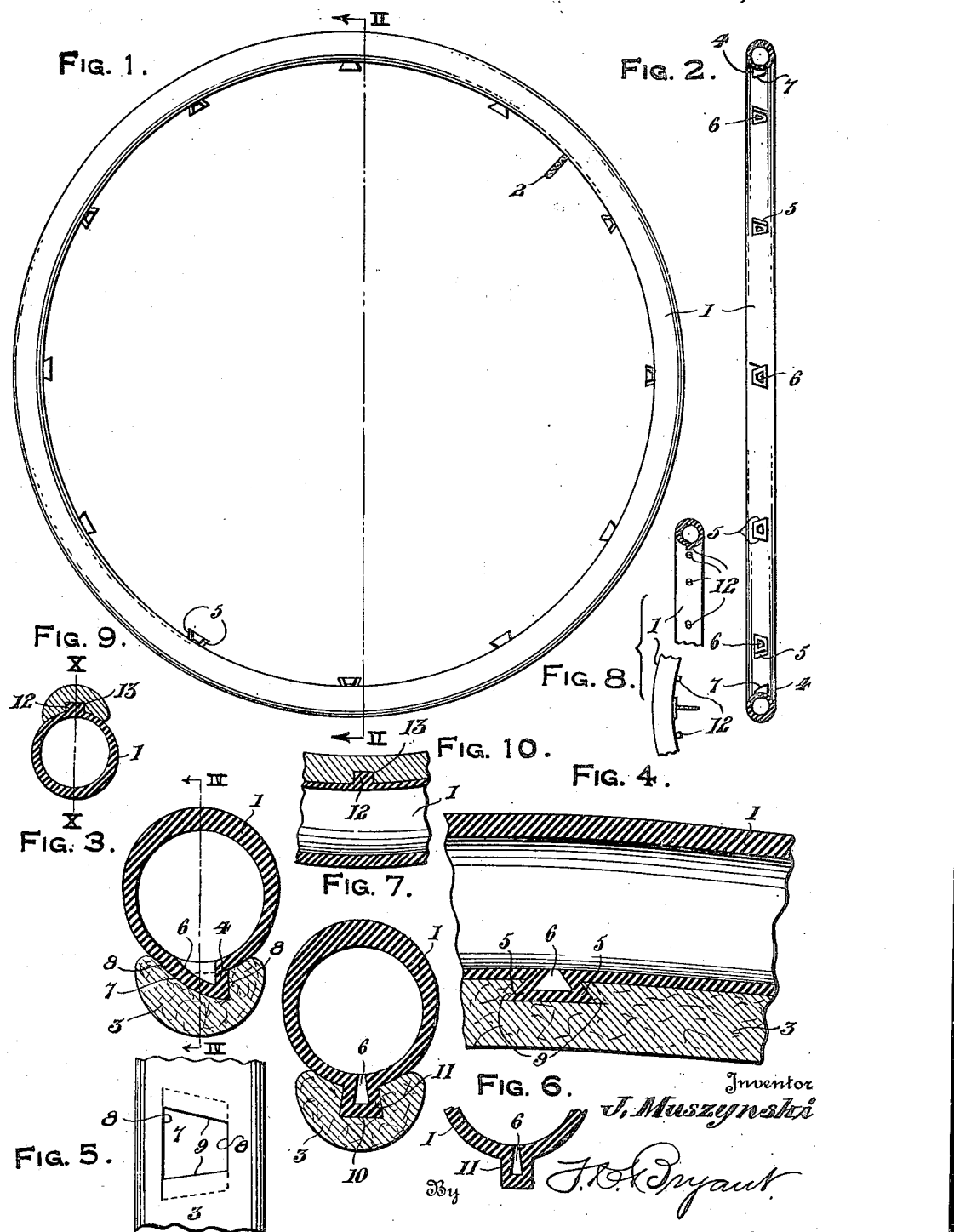

1,431,323

UNITED STATES PATENT OFFICE.

JOHN MUSZYNSKI, OF COLLINSVILLE, CONNECTICUT.

BICYCLE TIRE.

Application filed February 16, 1922. Serial No. 537,006.

*To all whom it may concern:*

Be it known that I, JOHN MUSZYNSKI, a citizen of Poland, residing at Collinsville, in the county of Hartford and State of Connecticut, have invented certain new and useful Improvements in Bicycle Tires, of which the following is a specification.

This invention relates to certain new and useful improvements in tires especially adapted for bicycles wherein a casing or shoe is inflated in the absence of a pneumatic inner tube, with interlocking devices carried by the tire and the wheel rim.

A further object of the invention resides in the provision of a series of hollow projections carried by the inner face of the tire adapted for reception in correspondingly shaped sockets formed in the outer face of the wheel rim, the projections and sockets being so constructed as to prevent lateral movement of the tire relative to the wheel rim.

The invention further embodies in a tire and rim of the type above set forth, the idea of providing a series of sockets in the outer face of the wheel rim for the reception of hollow projections carried by the inner face of the tire whereby upon inflation of the tire, such projections will be expanded and interlocked with the wheel rim.

With the above and other objects in view, the invention consists of the novel form, combination and arrangement of parts hereinafter more fully described, shown in the accompanying drawing and claimed.

In the drawing, wherein like reference characters indicate corresponding parts throughout the several views, Figure 1 is a side elevational view of a bicycle tire constructed in accordance with the present invention, showing the projections carried by the inner face of the tire for interlocking engagement with the wheel rim, Figure 2 is a cross sectional view taken on line II—II of Fig. 1, Figure 3 is a cross sectional view of the tire and rim showing one of the projections carried by the tire received in a socket formed in the wheel rim, Figure 4 is a detail sectional view taken on line IV—IV of Fig. 3, showing the projections carried by the tire expanded and interlocked with the wheel rim.

Figure 5 is a plan view of a portion of the inner face of the wheel rim showing the socket formed therein for receiving the projections carried by the tire with the undercut side walls of the socket to confine the projection carried by the tire, Figure 6 is a fragmentary detail sectional view of the tire showing a modified form of projection, the latter being in the form of a hollow stud adapted for expansion when the tire is under air pressure, Figure 7 is a detail sectional view showing the form of tire illustrated in Fig. 6 operatively mounted upon a wheel rim, Figure 8 shows fragmentary side and sectional views of another modified form of the invention wherein solid plugs project inwardly from the tire, Figure 9 is a cross sectional view of the tire shown in Fig. 8, and Figure 10 is a fragmentary transverse sectional view taken on line X—X of Fig. 9, showing the solid plug received in a socket formed in the wheel rim.

Referring more in detail to the accompanying drawing, and particularly to Figs. 1 to 5 there is illustrated a bicycle tire and rim, the tire being designated by the reference numeral 1 of ordinary construction having an air filling valve stem 2.

Means is provided for forming an interlocking connection between the tire 1 and the wheel rim 3, such connection including inflatable plug projections carried by the tire and sockets of corresponding formation formed in the outer face of the wheel rim. The configuration of the plug is shown more clearly in Figs. 2 and 3, each plug embodying a side wall 4 projecting inwardly from the inner side of the tire 1, tapering side walls 5 and an outwardly curved bottom wall 6, it being noted from an inspection of Fig. 1 of the drawing that the side walls 5 are undercut or taper toward the tire 1.

The formation of the socket in the wheel rim for receiving the plug projection carried by the tire is shown more clearly in Figs. 3, 4 and 5, the socket 7 having perpendicular side walls 8 extending circumferentially of the wheel rim while the side walls 9 as shown in Figs. 4 and 5 are undercut for cooperation with the undercut or tapered side walls 5 of the plug. It is further noted that the plug and socket are arranged in pairs, the inclined side walls 5 and 9 of the plugs and sockets respectively of each adjacent pair extending in opposite direction transversely of the tire and rim, this arrangement preventing lateral movement of the tire relative to the rim.

In mounting the tire 1 on the rim 3, assuming that the tire is in a deflated condition, the plugs carried by the inner face of the tire are received in correspondingly formed sockets 7 in the wheel rim, and upon inflation of the tire, air admitted thereto is received in the hollow projections or plugs with the result that the plugs are expanded to cause the inclined side walls thereof to engage the undercut or inclined side walls 9 of the socket, thereby forming an interlocking connection between the tire and wheel rim. This construction and operation is clearly shown in Fig. 4.

A modified form of the invention is shown in Figs. 6 and 7, wherein the rim 3 is provided with a plurality of circumferentially alined circular sockets 10 having the side walls thereof diverging toward the axis of the wheel. The tire 1 carries hollow cylindrical projections 11 that are received in the cylindrical socket, and upon inflation of the tire the cylindrical projections are expanded and caused to interlock with the rim sockets 10.

From the above detail description of the device in each of its forms, it is thought that the construction and operation thereof will at once be apparent, it being noted that inflation of the tire causes an expansion of the plugs to form an interlocking connection between the tire and wheel rim, the arrangement of the plugs and sockets shown in Figs. 1 to 5 of the drawing preventing non-creeping lateral movement of the tire relative to the wheel rim. Inflation of the plugs in sockets shown in Fig. 7 will also eliminate creeping movement of the tire relative to the rim and also provide a positive interlocking connection between the tire and rim.

Another modified form of the invention is shown in Figs. 8 to 10, wherein the inner wall of the tire 1 carries inwardly directed solid plugs 12 received in similarly shaped sockets 13 provided in the wheel rim 3. It will be seen that the solid plugs 12 being interlocked with the wheel rim, will prevent lateral creeping movement of the tire relative to the rim, and will also eliminate circumferential movement of the tire on the rim.

While there are herein shown and described the preferred embodiments of the present invention it is nevertheless to be understood that minor changes may be made therein without departing from the spirit and scope thereof.

What is claimed as new is:—

1. In a bicycle tire of the type described, a pneumatic tire, hollow projections carried by the inner face thereof, and a wheel rim having sockets formed in the outer face thereof to receive said tire projections to prevent movement of the tire relative to the rim.

2. In a bicycle tire and wheel rim of the type described, a pneumatic tire having projections of hollow construction carried by the inner face thereof, each projection including a perpendicular side wall, inclined and undercut end walls and a curved bottom wall merging into the side of the tire, said projections being arranged in pairs with the perpendicular side walls of adjacent pairs disposed at opposite sides of the tire.

In testimony whereof I affix my signature.

JOHN MUSZYNSKI.